Feb. 6, 1951 S. PITT ET AL 2,540,833
STRAND GUIDE FOR UNIT TYPE STRANDERS
Filed Sept. 8, 1949 5 Sheets-Sheet 2
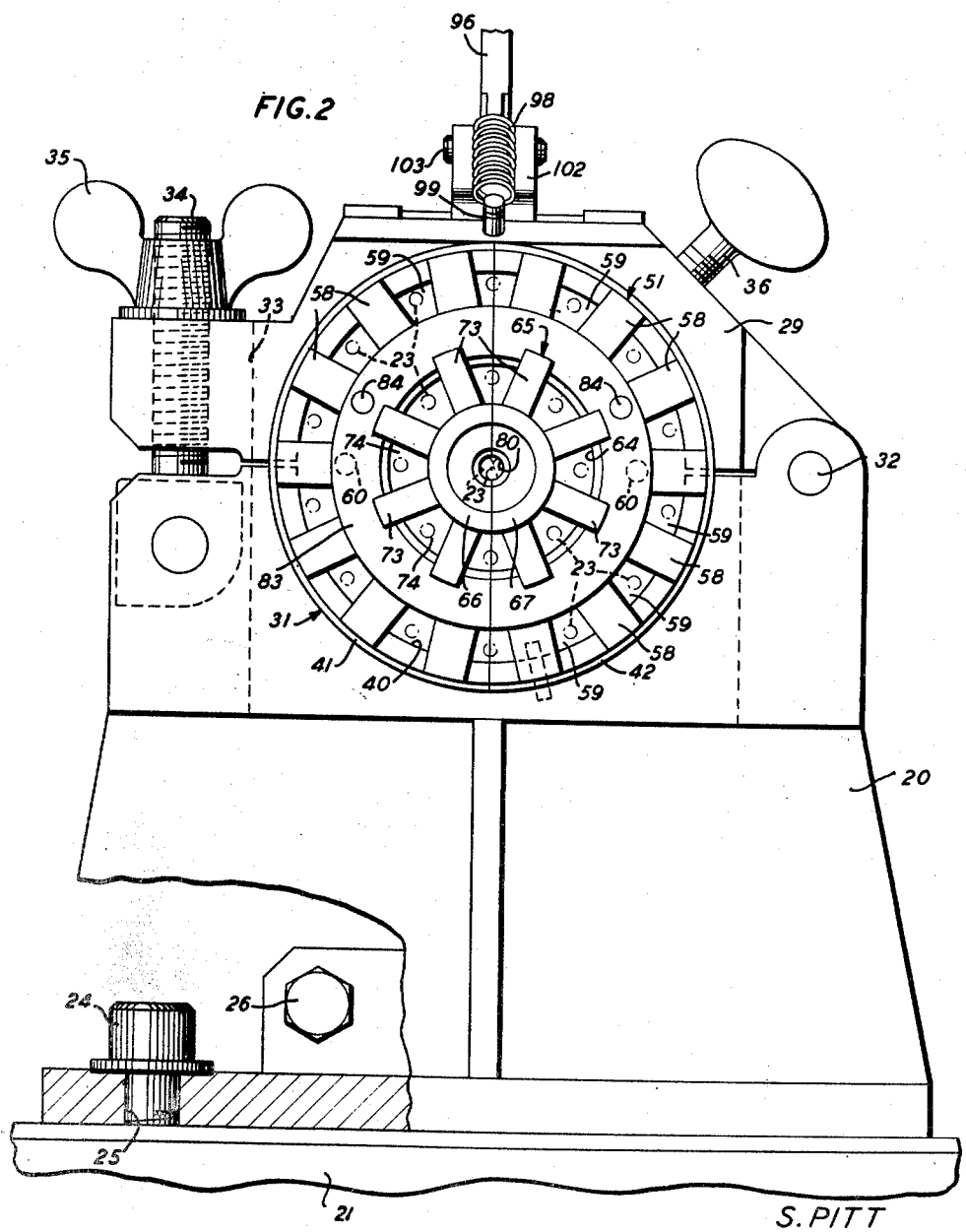
INVENTORS S. PITT
G. C. SPILLMAN
L. G. WADE
BY W. C. Parnell
ATTORNEY Feb. 6, 1951 S. PITT ET AL 2,540,833
STRAND GUIDE FOR UNIT TYPE STRANDERS
Filed Sept. 8, 1949 5 Sheets-Sheet 3
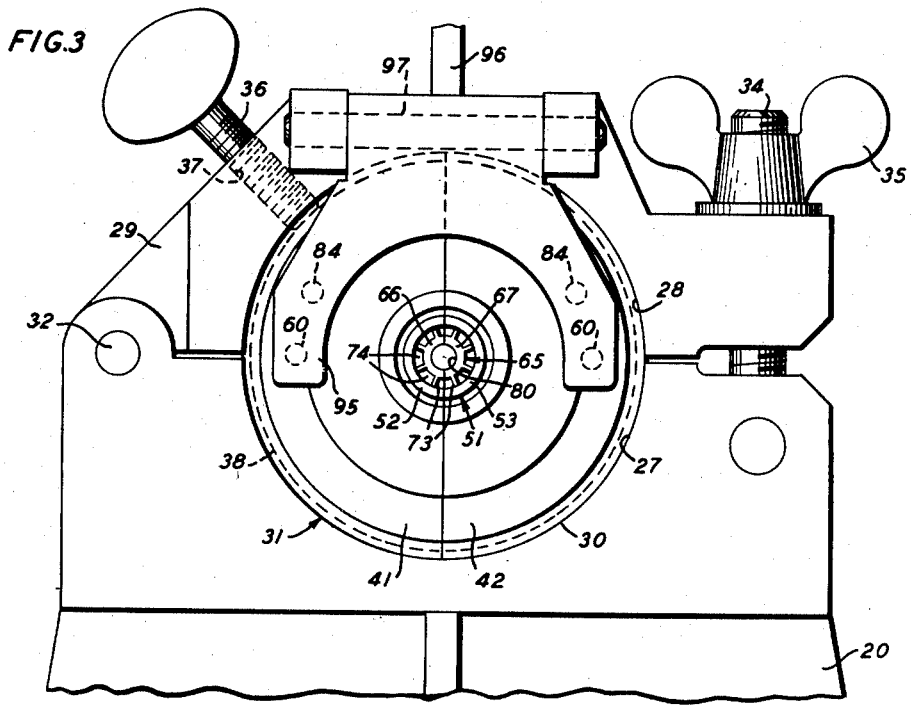
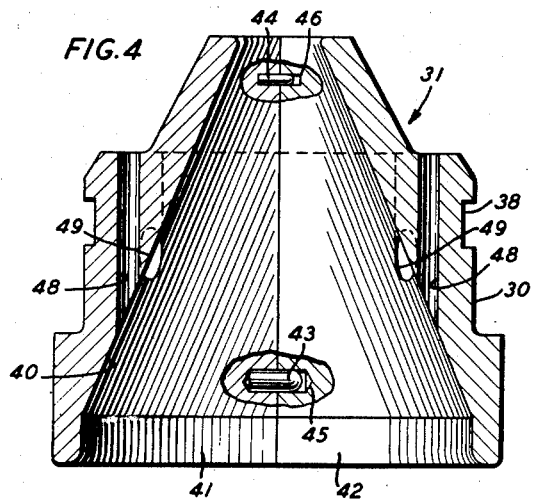
INVENTORS  S. PITT
G.C. SPILLMAN
L.G. WADE
BY
*W.C. Parnell*
ATTORNEY Feb. 6, 1951 S. PITT ET AL 2,540,833
STRAND GUIDE FOR UNIT TYPE STRANDERS
Filed Sept. 8, 1949 5 Sheets-Sheet 4

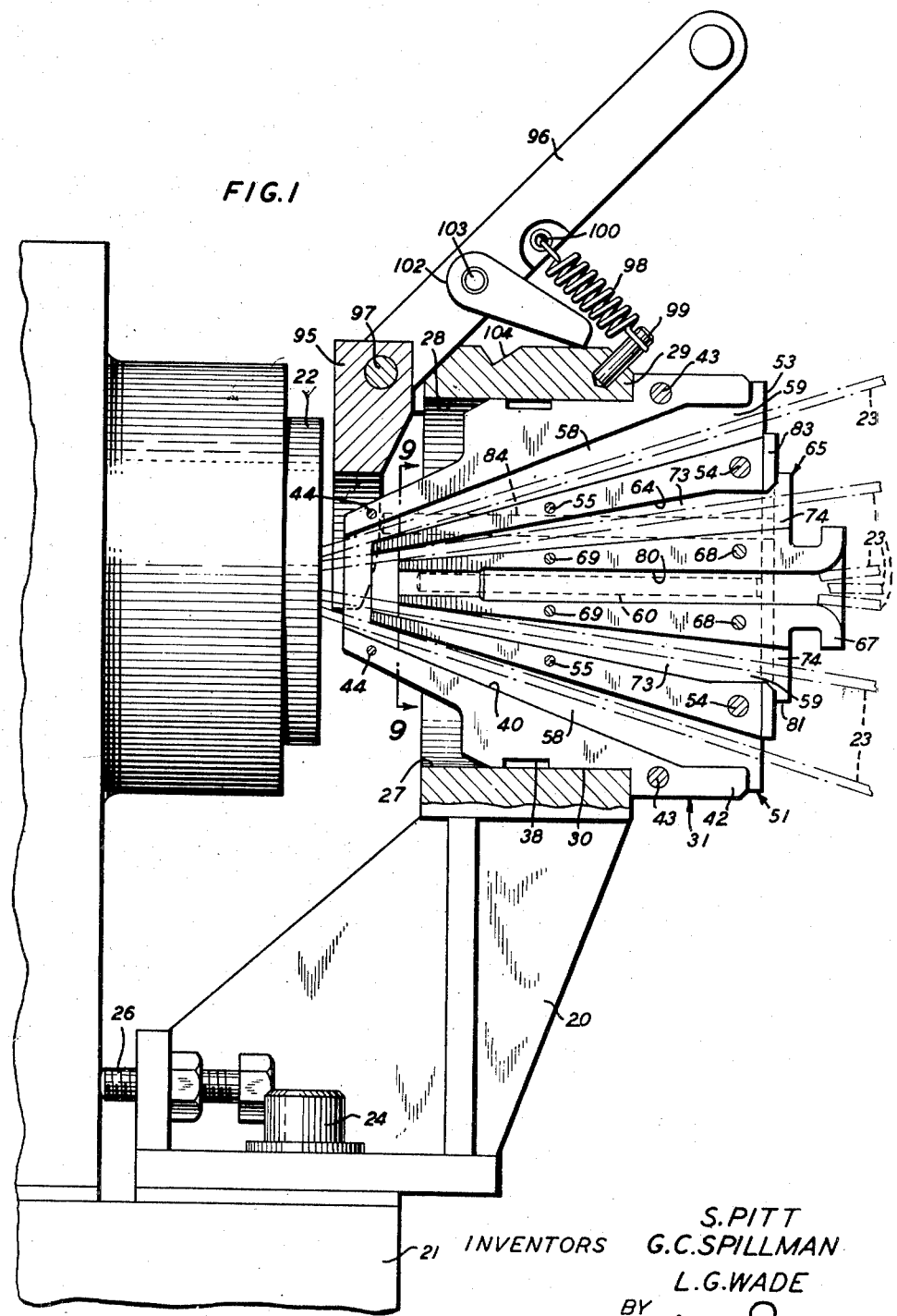

INVENTORS S. PITT
G. C. SPILLMAN
L. G. WADE
BY
ATTORNEY

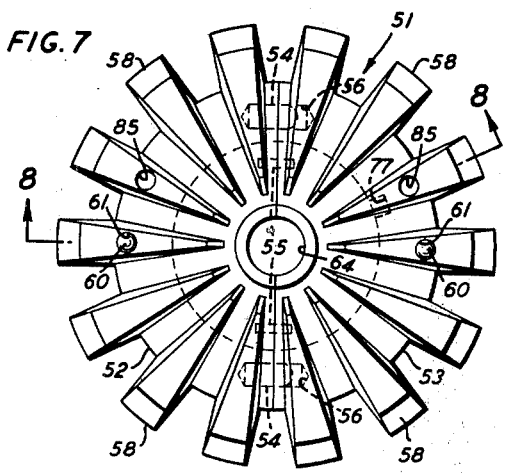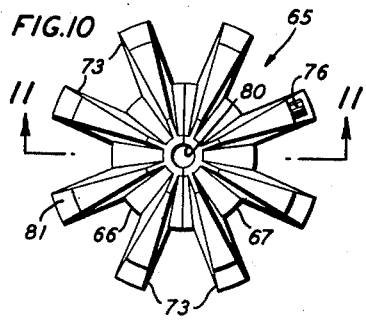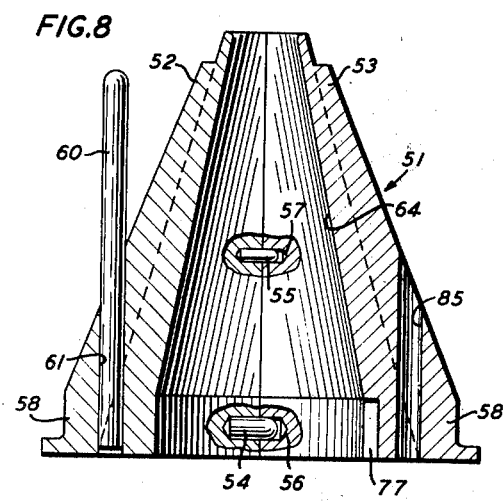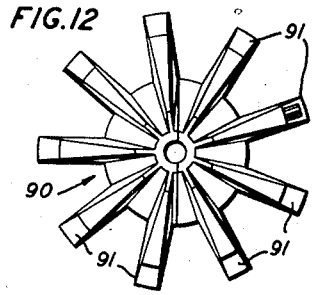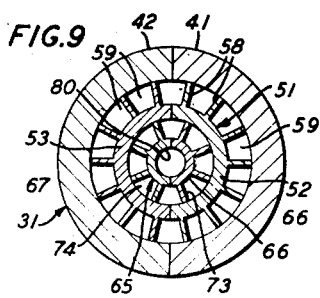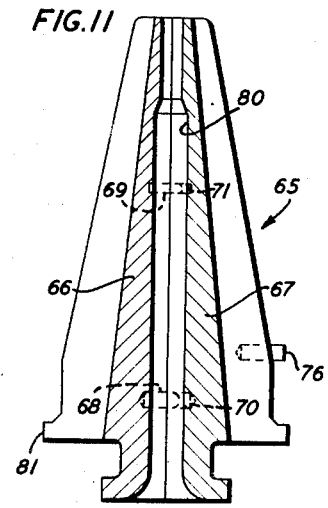

Patented Feb. 6, 1951

2,540,833

UNITED STATES PATENT OFFICE 2,540,833

STRAND GUIDE FOR UNIT TYPE STRANDERS

Samuel Pitt, Westfield, Gordon C. Spillman, Roselle, and Lorentz G. Wade, Westfield, N. J., assignors to Western Electric Company, Incorporated, New York, N. Y., a corporation of New York Application September 8, 1949, Serial No. 114,624

8 Claims. (Cl. 57—138)

1

This invention relates to strand guides for unit type stranders and more particularly to guides for insulated electrical conductors in cable forming machines.

In the forming of cables for use in the art of telephony, it is important that the conductor strands or pairs be laid and maintained in a given order with respect to each other to produce a cable which has the desired electrical characteristics. Heretofore, guides have been provided for the strands, but such guides have not maintained accurate control of the strands sufficiently close to the point where they are spirally twisted together to control the laying of the strands in their exact positions in the cable.

An object of the invention is to provide a strand guide for unit type stranders wherein the individual strands or pairs of strands are individually guided to the position where they are twisted together to produce a uniform unit or cable.

In accordance with the object, the invention comprises interfitting hollow members with fins providing individual guiding passageways for the strands leading them to their exact positions in a cable formed from the strands.

More specifically the strand guide includes a conical housing with an intermediate conical member having radially extending fins disposed in the housing to produce individual strand guiding passageways. An inner conical member similar to the intermediate conical member, having radially extending fins providing individual guiding passageways is normally held in the intermediate member and the intermediate member is normally held in the housing by the combined forces of the strands during their advancement longitudinally. A cam is actuable into a position, where it is held by a latch, to move both the intermediate and inner members outwardly into open positions to allow the conventional knots to pass through the guide when the following ends of the first set of strands are tied to the leading ends of a new supply of strands.

Other objects and advantages will be apparent from the following detailed description when considered in conjunction with the accompanying drawings, wherein Fig. 1 is a side elevational view of the strand guide mounted in advance of a forming die in a stranding machine;

Fig. 2 is an end elevational view of the stranding guide looking from the right of Fig. 1;

Fig. 3 is another end elevational view of the strand guide looking from the left of the unit in Fig. 1;

Fig. 4 is a longitudinal sectional view of the conical housing;

Fig. 7 is an end elevational view of the intermediate member;

Fig. 8 is a longitudinal sectional view of the intermediate member taken along the line 8—8 of Fig. 7;

Fig. 9 is a vertical sectional view taken along the line 9—9 of Fig. 1;

Fig. 10 is an end elevational view of the inner member;

Fig. 11 is a longitudinal sectional view of the inner member taken along the line 11—11 of Fig. 10; and Fig. 12 is an end elevational view of another species of an inner member.

Figure 5:
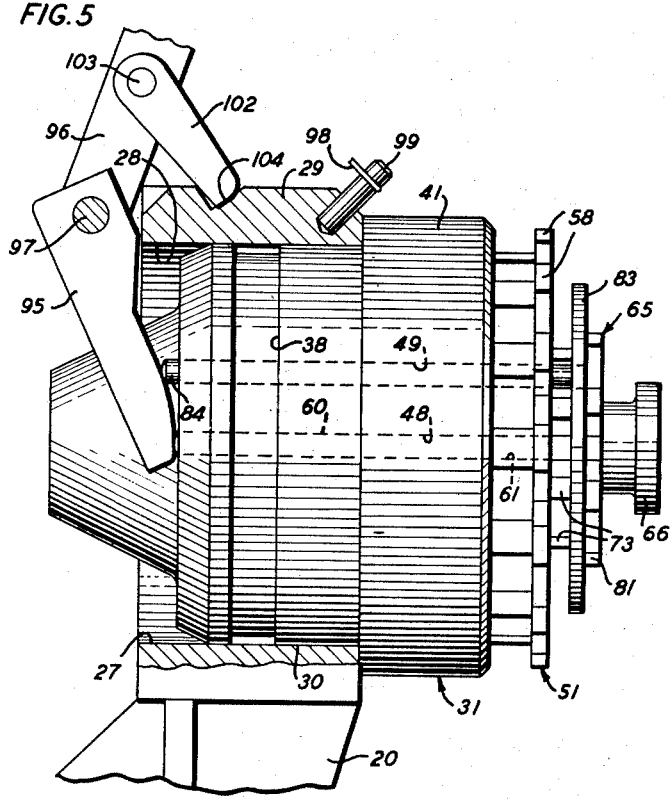
Fig. 5 is a fragmentary sectional view of the strand guide showing the intermediate and inner units moved by the cam into their open positions.

Referring now to the drawings, the strand guide has a supporting bracket 20 mounted upon a frame 21 of one of the units in a stranding machine supporting a die 22 which is rotated in the conventional manner to spirally twist strands 23, which in the present embodiment are insulated electrical conductors to form a cable unit. The bracket 20 is mounted on the frame by the aid of machine screws 24 extending through elongate apertures 25 in the bracket for mounting the bracket a given distance from the die 22, controlled by an adjustable stop 26. The upper portion of the bracket has a concaved recess 27 therein cooperating with a concaved recess 28 of a clamp 29 to removably receive an annular portion 30 of a housing 31. One end of the clamp 29 is hinged at 32 while the other end is notched at 33 (Fig. 2) to receive a bolt 34 provided with a wing nut 35 to secure the clamp in position and in this manner firmly hold the housing 31 in place. A locking screw 36 threadedly mounted in an aperture 37 in the clamp 29 normally extends into an annular groove 38 of the housing 31 to secure the housing against rotation.

In the present embodiment of the invention the housing 31 is conical in general contour, particularly the inner portion 40 thereof and is formed into two parts 41 and 42 joined together accurately by the aid of two sets of pins 43 and 44 firmly mounted in apertures in the part 41 and removably receivable in apertures 45 and 46 of the part 42. The housing 31, that is the parts 41 and 42 thereof, is provided with sets of apertures 48 and 49 to receive pins for the intermediate and inner members of the guide.

The intermediate member 51 shown in detail in Figs. 7 and 8 is substantially conical in general contour and formed of members 52 and 53 secured together in the same manner as the parts 41 and 42 of the housing are secured together, namely by the aid of sets of pins 54 and 55, fixedly mounted in apertures of the part 52 and removably receivable in apertures 56 and 57 of the part 53. The parts 52 and 53 of the intermediate member 51 have substantially radially extending fins 58 receivable in the conical opening 40 of the housing 41 and cooperating therewith to provide individual passageways 59 for an outer group of strands. Pins 60 fixedly mounted in apertures 61 of the parts 52 and 53 are receivable in the apertures 48 of the housing 31 serving as ejecting or cam actuable pins in moving the intermediate member into open position.

Figure 6:
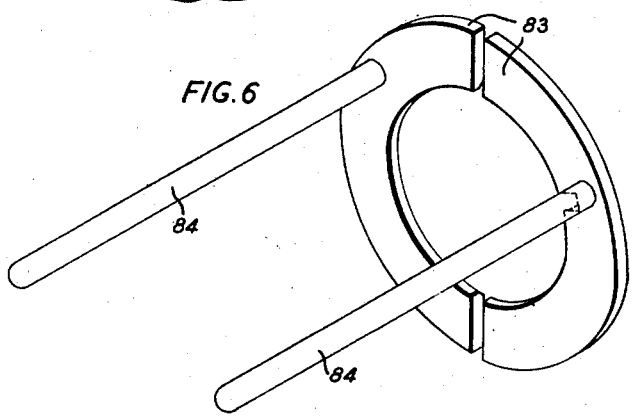
Fig. 6 is an isometric view of the yoke and push rods for use in moving the inner member into its open position.

An inner member indicated generally at 65 shown in detail in Figs. 10 and 11 is substantially conical in general contour and receivable in the conical opening 64 of the intermediate member 51. The inner member 65 is also similar in contour to the intermediate member in that it is formed of two parts 66 and 67 removably joined together by sets of pins 68 and 69 which are fixedly mounted in apertures in the member 66 and removably receivable in apertures 70 and 71 in the member 67. The members 66 and 67 in this species of the invention have a like number of radially extending fins 73 which when disposed in the conical opening 66 of the intermediate member 51 will form a plurality of individual passageways 74 for the strands 23. A pin 76 carried by the part 67 of the member 65 is receivable in a groove 77 of the part 53 of the member 51 to maintain accurate positioning of the members 51 and 65 and to hold the member 65 against rotation within the member 51. Cooperating longitudinal grooves in the parts 66 and 67 provide a central passageway 80 through the member 65 for the core strands 23 as illustrated in Figs. 1 and 2. An annular flange 81 of the member 65 composed of the semi-circular members of the parts 66 and 67 cooperates with yoke members 83 (Fig. 6) which carry pins 84 receivable in the apertures 49 of the housing 31 and in aligned apertures 85 in the parts 52 and 53 of the intermediate member 51. The position of the pins 84 in the aligned apertures of the intermediate member and the housing assure maintenance of the yoke members 83 in engagement with the flange 81 of the inner member 65.

The inner member 65 as shown in Fig. 10 is provided with eight fins and a central core opening the fins dividing the conical opening 66 of the intermediate member into eight passageways. It is possible to vary the number of individual passageways depending upon the number of strands or pairs of strands to be advanced through the guide. As an illustration, the species of an inner member 90 shown in Fig. 12 is identical in every detail to the structure shown in Figs. 10 and 11 with the exception of the number of fins, there being shown nine fins 91 in addition to the core passageway thus dividing the opening 66 of the intermediate unit into nine individual passageways.

A substantially U-shaped cam 95, fixed to a hand lever 96 and pivotally supported at 97 on the clamp 29, is normally urged into the position shown in Fig. 1 by a spring 98, one end of which is fixed to a pin 99 and the other end connected to the hand lever 96 at 100. The ends of the cam 95 tend to straddle the inner end of the housing 31 and are positioned to engage the pins 84 and 60 when moved from the position shown in Fig. 1 to the position shown in Fig. 5. A latch 102 pivotally supported at 103 on the hand lever 96 rides on the upper surface of the clamp 29 until it enters a notch 104 where it remains, until released, holding the cam 95 in its actuated position (Fig. 5). The cam first engages the pins 84 moving the yoke 83 a given distance to move the inner member 65 relative to the intermediate member 51. Continued movement of the cam into its latched position will move the pins 84 with the inner member a further distance during which time the cam will engage the pins 60 and move them longitudinally moving the intermediate members into the open position shown in Fig. 5. When in this position, the individual passageways are opened or enlarged substantially doubling their cross-sectional areas to enable knotted ends of the strands to pass through the unit after which the unit may be closed by lifting the latch 102 from the notch 104 allowing the spring 98 to function in returning the lever and cam to their normal positions.

During the normal operation of the guide, the inner member 65 is held firmly in the aperture 66 of the intermediate member 51 by the force contributed by the strands 23 in advancing longitudinally through their individual passageways. The same effect takes place regarding the intermediate member in that the strands or pairs of strands 23 travelling through their individual passageways 59 will contribute a sufficient force to hold the intermediate member in place. It is apparent that the housing 31 formed of substantially conical members with similar conical inner portions constructed and held together in the same manner as the intermediate member 51 and the inner member 65 when in use, compose three interfitting units which may be readily assembled or disassembled. Furthermore, the interfitting arrangement of the members assures against rotation of one of the members with respect to another, and the utilization of the forces received from the advancing strands to maintain these members in assembly, eliminates the necessity of holding means and renders the opening mechanism, which constitutes only the cam and its latch, accessible to readily open the guide either while the strander is idle or during operation thereof, merely by moving the cam from the position shown in Fig. 1 to the position shown in Fig. 5. Furthermore, the inner member and the intermediate member will automatically move into closed position when released by the cam during operation of the strander. Furthermore, the construction of the guide is such that the various parts are removably joined together in a single plane, completing what appears to be a solid unit during normal operation of the strander of which the guide is an important part, with members movable into open positions when desired and wherein the parts may be divided simultaneously when the guide is removed from the clamp.

It is to be understood that the above described arrangements are simply illustrative of the application of the principles of the invention.

Numerous other arrangements may be readily devised by those skilled in the art which will embody the principles of the invention and fall within the spirit and scope thereof.

What is claimed is:

1. A guide for longitudinally advancing strands to be assembled into a cable, the guide comprising a housing having a substantially conical shaped opening therethrough, a substantially conical member having longitudinal grooves in the periphery thereof closed by the surface of the opening in the housing to complete individual passageways for the strands to guide them to their respective locations in the cable, the member being held in the opening of the housing by an accumulated frictional force derived from the strands while the strands are advancing through the passageways, and a mechanism actuable to move the member relative to the housing to increase the sizes of the passageways for the passage of knotted ends of the strands.

2. A guide for longitudinally advancing strands to be assembled into a cable, the guide comprising a housing having a substantially conical shaped opening therethrough, a substantially conical member having longitudinal grooves in the periphery thereof closed by the surface of the opening in the housing to complete individual passageways for the strands to guide them to their respective locations in the cable, the member being held in the opening of the housing by an accumulated frictional force derived from the strands while the strands are advancing through the passageways, a mechanism actuable to move the member relative to the housing to increase the sizes of the passageways for the passage of knotted ends of the strands, and a latch to hold the mechanism in the actuated position.

3. A guide for longitudinally advancing strands to be assembled into a cable, the guide comprising a housing having a substantially conical shaped opening therethrough, an intermediate substantially conical member having a substantially conical opening therethrough and radially extending fins forming longitudinally extending grooves closed by the surface of the opening of the housing to complete an outer series of individual passageways for certain of the strands to guide them to their respective locations in the cable, an inner substantially conical member having radially extending fins forming longitudinally extending grooves closed by the surface of the opening of the intermediate member to complete an inner series of individual passageways for other strands to guide them to their respective locations in the cable, and a mechanism actuable to move the members relative to each other and the housing to increase the sizes of the passageways for the passage of knotted ends of the strands.

4. A guide for longitudinally advancing strands to be assembled into a cable, the guide comprising a housing having a substantially conical shaped opening therethrough, an intermediate substantially conical member having a substantially conical opening therethrough and radially extending fins forming longitudinally extending grooves closed by the surface of the opening of the housing to complete an outer series of individual passageways for certain of the strands to guide them to their respective locations in the cable, an inner substantially conical member having a central longitudinal aperture for core strands and radially extending fins forming longitudinally extending grooves closed by the surface of the opening of the intermediate member to complete an inner series of individual passageways for other strands to guide them to their respective locations between the outer series of strands and the core strands in the cable, push rods carried by the inner and intermediate members, and an element actuable to move the rods to move the members relative to the housing and each other to increase the sizes of the passageways.

5. In a stranding machine having a rotatable die to receive longitudinally advancing strands and spirally twist them into a cable or the like, a guide for the strands comprising a housing having a substantially conical shaped opening therethrough disposed in alignment with the die with its exit end closely adjacent the die, an intermediate substantially conical member having a substantially conical opening therethrough and radially extending fins forming longitudinally extending grooves closed by the surface of the opening of the housing to complete an outer series of individual passageways for certain of the strands to guide them to their respective locations in the cable, an inner substantially conical member having radially extending fins forming longitudinally extending grooves closed by the surface of the opening of the intermediate member to complete an inner series of individual passageways for other strands to guide them to their respective locations in the cable, and a mechanism actuable during rotation of the die and longitudinal advancement of the strands to move the members relative to each other and the housing to increase the sizes of the passageways.

6. A guide for longitudinally advancing strands to be assembled into a cable, the guide comprising a housing having a substantially conical shaped opening therethrough, a substantially conical member having longitudinal grooves in the periphery thereof closed by the surface of the opening in the housing to complete individual passageways for the strands to guide them to their respective locations in the cable, the housing and the member being formed in sections, and individual interfitting means to removably secure the housing and member sections together whereby the sections of the die may be separated simultaneously.

7. A guide for longitudinally advancing strands to be assembled into a cable, the guide comprising a housing having a substantially conical shaped opening therethrough, an intermediate substantially conical member having a substantially conical opening therethrough and radially extending fins forming longitudinally extending grooves closed by the surface of the opening of the housing to complete an outer series of individual passageways for certain of the strands to guide them to their respective locations in the cable, and an inner substantially conical member having radially extending fins forming longitudinally extending grooves closed by the surface of the opening of the intermediate member to complete an inner series of individual passageways for other strands to guide them to their respective locations in the cable, the housing, the intermediate member and the inner member being formed of interconnected sections whereby the die may be divided into a plurality of parts by simultaneously disconnecting the sections.

8. A guide for longitudinally advancing strands to be assembled into a cable, the guide comprising a housing having a substantially conical shaped opening therethrough, an intermediate substantially conical member having a substantially conical opening therethrough and radially extending fins forming longitudinally extending grooves closed by the surface of the opening of the housing to complete an outer series of individual passageways for certain of the strands to guide them to their respective locations in the cable, an inner substantially conical member having radially extending fins forming longitudinally extending grooves closed by the surface of the opening of the intermediate member to complete an inner series of individual passageways for other strands to guide them to their respective locations in the cable, the housing, the intermediate member and the inner member being formed of interconnected sections whereby the die may be divided into a plurality of parts by simultaneously disconnecting the sections, and separate interconnecting means to hold the inner member against rotation in the intermediate member and the intermediate member against rotation in the housing.

SAMUEL PITT.
GORDON C. SPILLMAN.
LORENTZ G. WADE.

REFERENCES CITED

The following references are of record in the file of this patent:

UNITED STATES PATENTS

| Number | Name | Date |
|---|---|---|
| 400,285 | Barraclough et al. | Mar. 26, 1889 |
| 2,260,443 | Downing, Sr. | Oct. 28, 1941 |

FOREIGN PATENTS

| Number | Country | Date |
|---|---|---|
| 237,898 | Germany | Sept. 13, 1911 |